US012216565B2

(12) United States Patent
Tate

(10) Patent No.: US 12,216,565 B2
(45) Date of Patent: Feb. 4, 2025

(54) PROGRAMMING ASSIST SYSTEM AND PROGRAMMING ASSIST METHOD

(71) Applicant: connectFree Corporation, Kyoto (JP)

(72) Inventor: Kristopher Andrew Tate, Kyoto (JP)

(73) Assignee: connectFree Corporation, Kyoto (JP)

( * ) Notice: Subject to any disclaimer, the term of this patent is extended or adjusted under 35 U.S.C. 154(b) by 0 days.

(21) Appl. No.: 17/613,447

(22) PCT Filed: May 21, 2020

(86) PCT No.: PCT/JP2020/020075
§ 371 (c)(1),
(2) Date: Nov. 22, 2021

(87) PCT Pub. No.: WO2020/235621
PCT Pub. Date: Nov. 26, 2020

(65) Prior Publication Data
US 2022/0214958 A1 Jul. 7, 2022

(30) Foreign Application Priority Data
May 23, 2019 (JP) ................................ 2019-096604

(51) Int. Cl.
*G06F 11/36* (2006.01)
(52) U.S. Cl.
CPC .................................... *G06F 11/36* (2013.01)
(58) Field of Classification Search
CPC ... G06F 11/36; G06F 11/3636; G06F 11/3664
See application file for complete search history.

(56) References Cited

U.S. PATENT DOCUMENTS

| 6,951,011 B1 * | 9/2005 | Sexton | G06F 11/3636 |
| | | | 717/124 |
| 8,448,139 B2 * | 5/2013 | Ghosh | G06F 11/3636 |
| | | | 717/124 |

(Continued)

FOREIGN PATENT DOCUMENTS

| CN | 101410904 A | 4/2009 | |
| CN | 102713863 A * | 10/2012 | ............ G06F 11/36 |

(Continued)

OTHER PUBLICATIONS

Salvaneschi et al., "ContextErlang: Introducing Context-oriented Programming in the Actor Model", Mar. 2012, ACM (Year: 2012).*

(Continued)

*Primary Examiner* — Wei Y Zhen
*Assistant Examiner* — Junchun Wu
(74) *Attorney, Agent, or Firm* — Merchant & Gould P.C.

(57) ABSTRACT

A programming support system includes one or more terminal devices and storage accessible from the one or more terminal devices. Each of the terminal devices includes: a providing module for providing a development environment for a program; an acquisition module for acquiring information indicating content of a failure event that has occurred in the program. A determination module determines an address from information indicating the content of the failure event according to predetermined rules. The storage holds information for each failure event in association with an address determined from the information indicating the content of each failure event.

10 Claims, 7 Drawing Sheets

(56) References Cited

U.S. PATENT DOCUMENTS

| | | | |
|---|---|---|---|
| 10,198,343 B2* | 2/2019 | Rehman | G06F 11/366 |
| 2006/0253837 A1 | 11/2006 | Hudson et al. | |
| 2007/0006160 A1* | 1/2007 | Kunz | G06F 8/75 |
| | | | 717/124 |
| 2008/0034351 A1* | 2/2008 | Pugh | G06F 11/36 |
| | | | 717/128 |
| 2009/0103902 A1* | 4/2009 | Matsuura | G11B 27/034 |
| | | | 386/353 |
| 2014/0289710 A1* | 9/2014 | Goto | G06F 11/3664 |
| | | | 717/128 |
| 2015/0106663 A1 | 4/2015 | Richter | |
| 2015/0278037 A1* | 10/2015 | Wada | G06F 13/28 |
| | | | 711/143 |
| 2017/0307246 A1 | 10/2017 | Ohara et al. | |
| 2017/0322867 A1* | 11/2017 | Jiao | G06F 11/2236 |
| 2019/0155722 A1* | 5/2019 | Gupta | G06N 20/00 |
| 2020/0097389 A1* | 3/2020 | Smith | G06F 11/0793 |
| 2020/0104504 A1* | 4/2020 | Chaiken | G06F 21/575 |
| 2020/0218803 A1 | 7/2020 | Otsuki et al. | |
| 2022/0214958 A1* | 7/2022 | Tate | G06F 11/36 |
| 2022/0382792 A1* | 12/2022 | Jayaraman | H04L 41/5032 |

FOREIGN PATENT DOCUMENTS

| | | | | |
|---|---|---|---|---|
| CN | 105335245 A | | 2/2016 | |
| CN | 104038486 B | * | 5/2017 | |
| CN | 107110552 A | | 8/2017 | |
| CN | 108959085 A | | 12/2018 | |
| CN | 109309848 B | * | 2/2021 | H04N 21/238 |
| JP | 2000-99367 A | | 4/2000 | |
| JP | 2001-243089 A | | 9/2001 | |
| JP | 2004133827 A | * | 4/2004 | |
| JP | 2005284594 A | * | 10/2005 | |
| JP | 2006253756 A | | 9/2006 | |
| JP | 2007199845 A | * | 8/2007 | G06F 11/3636 |
| JP | 4872857 B2 | * | 2/2012 | |
| JP | 2014182646 A | * | 9/2014 | G06F 11/3636 |
| JP | 2016-133294 A | | 7/2016 | |
| JP | 6213345 B2 | * | 10/2017 | G06F 11/106 |
| WO | 2007/086150 A1 | | 8/2007 | |
| WO | 2019/013033 A1 | | 1/2019 | |

OTHER PUBLICATIONS

Pietraszek et al., "Defending Against Injection Attacks Through Context-Sensitive String Evaluation", 2006, Springer-Verlag Berlin Heidelberg (Year: 2006).*
Lam et al., "Securing Web Applications with Static and Dynamic Information Flow Tracking", 2008, ACM (Year: 2008).*
Huang et al., "Web Application Security Assessment by Fault Injection and Behavior Monitoring", May 2003, ACM (Year: 2003).*
International Search Report for PCT/JP2020/020075 (Sep. 1, 2020).
Office Action for Taiwanese Patent Application No. 109117086 (Aug. 23, 2023).
Search Report for European Patent Application No. 20810659.1 (Jun. 2, 2023).
Taiwan Office Action received for TW Application No. 109117086 on Apr. 30, 2024, 12 pgs.
Japanese Decision to Grant received for JP Serial No. 2019-096604, 5 pgs.

* cited by examiner

FIG.3

```
Function foo() {

For (int i = 0; i < dev_num+1; i++){
    Start_Addr = getDeviceAddr(objDev1)
    InputValues[i]=IOread(Start_Addr[i])
} return InputValues
}
```

(A)

```
Backtrace(foo)
>>
IO 2b81fc26 e1a902 req,0x2
IO 2b81fc26 e1a902 move
IO 2b81fc26 e1a903 req,0x2
IO 2b81fc26 e1a903 move
: :
IO 2b81fc26 e1a913 req,0x2
fault --> 2b81fc26 e1a913 req ds:ff2802=????????
IO_stack_overflow
<<
```

(A)  https://www.supportxxx.cf.com/items/35ef3e008ba40d63b72639
b03c62c778fa653f7c4cdc143b94df54fb (B)  https://www.supportxxx.cf.com/getitem.cgi?id=35ef3e008ba40d6
3b72639b03c62c778fa653f7c4cdc143b94df54fb

PROGRAMMING ASSIST SYSTEM AND PROGRAMMING ASSIST METHOD

This application is a National Stage of PCT/JP2020/020075, filed May 21, 2020, which claims benefit of priority to Japanese Patent Application No. 2019-096604, filed May 23, 2019, which applications are incorporated herein by reference. To the extent appropriate, a claim of priority is made to each of the above-disclosed applications.

TECHNICAL FIELD

The present disclosure relates to a programming support system and a programming support method.

BACKGROUND ART

The development of information and communication technology (ICT) has been remarkable in recent years, and devices connected to a network, such as the Internet, are not limited to information processing devices, such as conventional personal computers or smartphones, and are spreading to various things. Such a technology trend is called "IoT (Internet of Things)", and various technologies and services have been proposed and put into practical use. In the future, a world is envisioned in which billions of people on Earth and tens of billions or trillions of devices are connected at the same time. In order to realize such a networked world, it is necessary to provide a solution that is simpler, safer, and more freely connected.

With the intelligentization of such devices, it is necessary to create various kinds of programs. On the other hand, when creating a program, it is necessary to correct (so-called debug) various errors included in the program. As a technique for correcting errors included in such a program, for example, JP 2001-243089 A (Patent Document 1) discloses an inspection device that facilitates the search for the cause of an abnormality in the software under test.

CITATION LIST

Patent Document

Patent Document 1: JP 2001-243089 A

SUMMARY OF THE INVENTION

Problem to be Solved by the Invention

Patent Document 1 merely discloses a method for analyzing the cause of failure by acquiring the internal state of the test program after the test program is stopped, but there is no instruction on how to analyze the cause of failure using the acquired internal state.

The present disclosure provides a solution that supports the programming of a wide variety of users.

Means for Solving Problem

A programming support system according to an aspect of the present disclosure includes one or more terminal devices and a storage means accessible from the one or more terminal devices. Each of the terminal devices includes: a providing means for providing a development environment for a program; an acquisition means for acquiring information indicating a content of a failure event that has occurred in the program; and a determination means for determining an address from the information indicating the content of the failure event according to predetermined rules. The storage means holds information for each failure event in association with an address determined from the information indicating the content of each failure event.

The determination means may input the information indicating the content of the failure event to a hash function to determine an address having a predetermined length.

The information for each failure event held by the storage means may be updated by a plurality of users.

The acquisition means may acquire the information indicating the content of the failure event by using a function of backtrace or stack trace.

The failure event that has occurred in the program may include at least one of a program run-time error and a program compile error.

A programming support method according to another aspect of the present disclosure includes: a step of acquiring information indicating a content of a failure event that has occurred in any program in a program development environment; a step of determining an address from the information indicating the content of the failure event according to predetermined rules; and a step of accessing information of a corresponding failure event held in association with the address based on the determined address.

Effect of the Invention

According to the present disclosure, it is possible to support the programming of a wide variety of users.

BRIEF DESCRIPTION OF DRAWINGS

FIG. 3 is a diagram for describing programming and backtrace in the programming support system according to the present embodiment;

FIG. 7 is a diagram showing an example of an address format used in the programming support system according to the present embodiment.

MODE(S) FOR CARRYING OUT THE INVENTION

Figure 1:
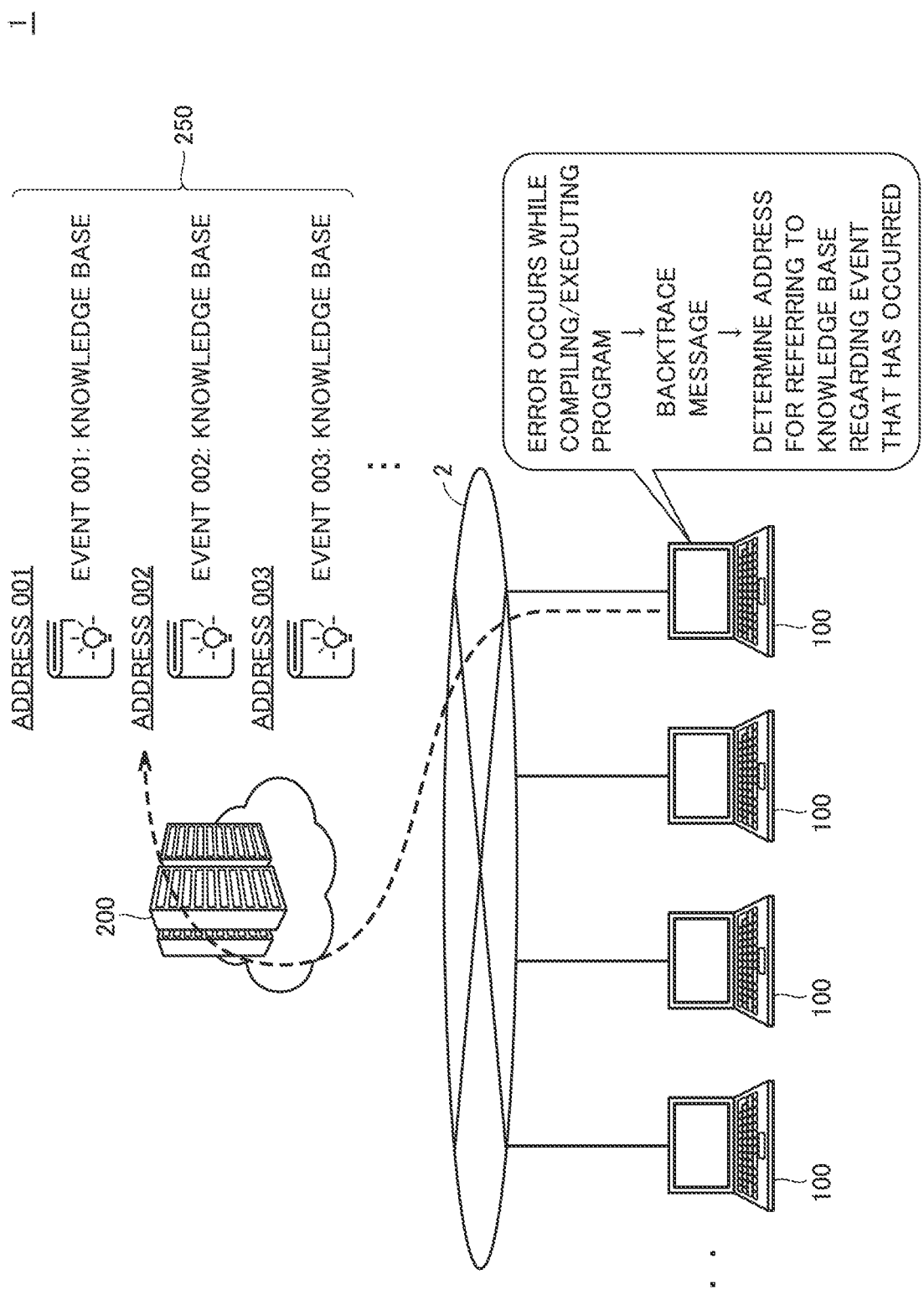
FIG. 1 is a schematic diagram showing an example of the overall configuration of a programming support system according to the present embodiment.

An embodiment according to the present disclosure will be described in detail with reference to the diagrams. In addition, the same or corresponding portions in the diagrams are denoted by the same reference numerals, and the description thereof will not be repeated.

<A. Overall Configuration of Programming Support System 1>

First, the overall configuration of a programming support system 1 according to the present embodiment will be described. The programming support system 1 provides information for supporting programming to one or more users (programmers).

FIG. 1 is a schematic diagram showing an example of the overall configuration of the programming support system 1 according to the present embodiment. Referring to FIG. 1, the programming support system 1 includes a server 200, which is configured to include one or more computers, and one or more terminal devices 100 that can access the server 200 through a network 2.

An integrated development environment (IDE) is provided for each of the terminal devices 100, so that the user can create an arbitrary program in the integrated development environment.

The server 200 corresponds to a storage unit that holds, manages, and provides information relevant to program creation in the integrated development environment of the terminal device 100. That is, the server 200 has a storage unit that can be accessed from one or more terminal devices 100. More specifically, the server 200 holds a knowledge base 250 for each failure event relevant to program creation, and provides requested information and updates information in response to access from any of the terminal devices 100. Access to the knowledge base 250 is realized by a unique address associated with each event.

For example, a case where an error occurs when compiling a certain program (source code) created in the integrated development environment of the terminal device 100 or a case where an error occurs when executing a compiled program (object format) is assumed. In such a case, information indicating the content of the failure event that has occurred (for example, an error context obtained by backtrace or the like) is acquired, and based on the acquired information, an address for referring to the knowledge base 250 regarding the failure event that has occurred is determined.

On the other hand, the server 200 holds information (knowledge base 250) for each failure event in association with an address determined from information indicating the content of each failure event. Therefore, based on the determined address, the user can easily access the corresponding knowledge base 250 for information for resolving the failure event that has occurred.

The information indicating the content of the failure event that has occurred (for example, a message obtained by backtrace) is information unique to the failure event. By using such unique information, it is possible to uniquely identify what kind of information is required. For example, when a plurality of users encounter the same failure event, substantially the same information is output. Therefore, by using the output error context or the like as a key, an address for accessing the necessary information can be determined.

As shown in FIG. 1, in the programming support system 1, a process of acquiring information indicating the content of a failure event that has occurred in any program in the program development environment, a process of determining the address from the information indicating the content of the failure event according to predetermined rules, and a process of accessing the information of the corresponding failure event held in association with the address based on the determined address are executed.

<B. Hardware Configuration Example>

Next, a hardware configuration example of a device included in the programming support system 1 according to the present embodiment will be described.

(b1: Terminal Device 100)

The terminal device 100 is typically realized by a general-purpose computer.

Figure 2:
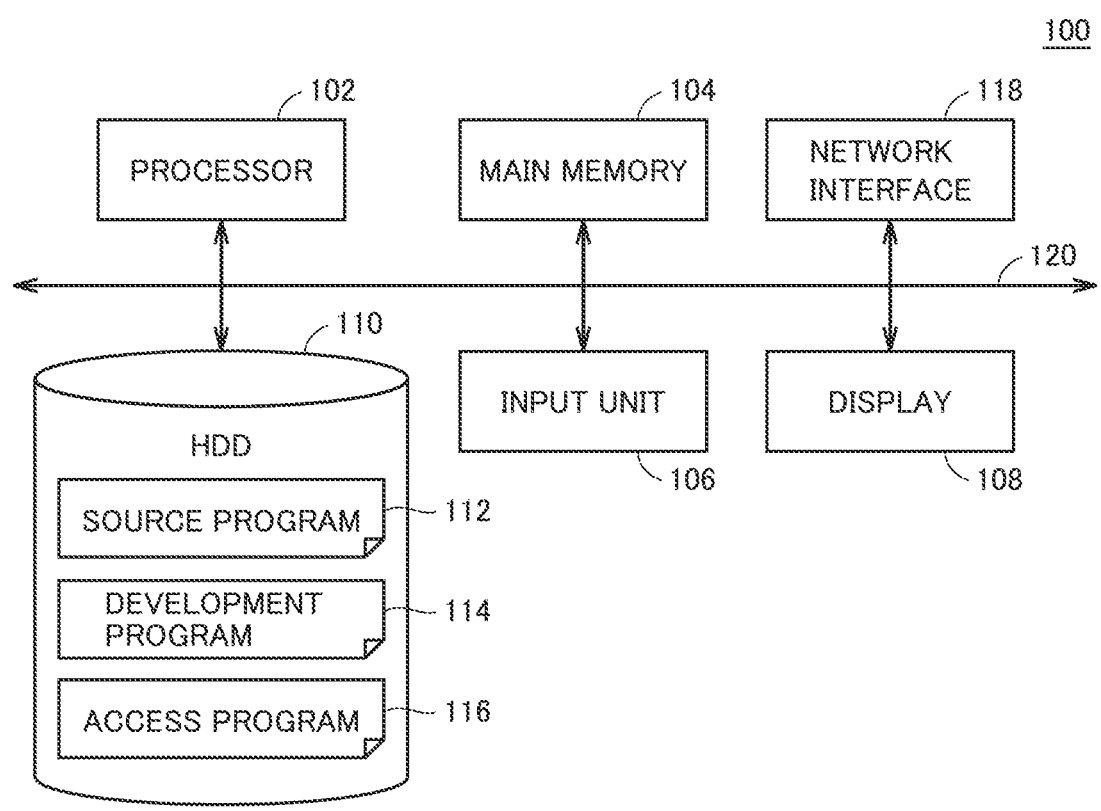
FIG. 2 is a schematic diagram showing a hardware configuration example of a terminal device included in the programming support system according to the present embodiment.

FIG. 2 is a schematic diagram showing a hardware configuration example of the terminal device 100 included in the programming support system 1 according to the present embodiment. Referring to FIG. 2, the terminal device 100 includes a processor 102, a main memory 104, an input unit 106, a display 108, a hard disk 110, and a network interface 118 as main components. These components are connected to each other through an internal bus 120.

The processor 102 may be, for example, a CPU (Central Processing Unit) or a GPU (Graphics Processing Unit). A plurality of processors 102 may be disposed, or the processor 102 having a plurality of cores may be adopted.

The main memory 104 is a volatile storage device, such as a DRAM (Dynamic Random Access Memory) or a SRAM (Static Random Access Memory). The hard disk 110 holds various programs executed by the processor 102 or various kinds of data. In addition, instead of the hard disk 110, a non-volatile storage device such as an SSD (Solid State Drive) or a flash memory may be adopted. Among the programs stored in the hard disk 110, a designated program is loaded to the main memory 104, and the processor 102 sequentially executes computer-readable instructions included in the program loaded to the main memory 104 to realize various functions described later.

Typically, the hard disk 110 stores a source program 112 arbitrarily created by the user, a development program 114 for realizing the integrated development environment, and an access program 116 for realizing access to the server 200 described later. The development program 114 includes a module that provides a program development environment, and the access program 116 includes a module that determines an address from information indicating the content of a failure event according to predetermined rules.

The input unit 106 receives an input operation of a user who operates the terminal device 100. The input unit 106 may be, for example, a keyboard, a mouse, a touch panel disposed on a display device, or an operation button disposed on the housing of the terminal device 100.

The display 108 displays the processing result of the processor 102 and the like. The display 108 may be, for example, an LCD (Liquid Crystal Display) or an organic EL (Electro-Luminescence) display.

The network interface 118 is in charge of communicating with the server 200 through the network 2.

Examples of the network interface 118 include wired connection terminals, such as serial ports including an Ethernet (registered trademark) port, a USB (Universal Serial Bus) port, and an IEEE1394 and a legacy parallel port. Alternatively, the network interface 118 may include processing circuits and antennas for wireless communication with devices, routers, mobile base stations, and the like. The wireless communication supported by the network interface 118 may be any of Wi-Fi (registered trademark), Bluetooth (registered trademark), ZigBee (registered trademark), LPWA (Low Power Wide Area), GSM (registered trademark), W-CDMA, CDMA200, LTE (Long Term Evolution), and 5th generation mobile communication system (5G), for example.

In addition, the entirety or part of the terminal device 100 may be realized by using a hard-wired circuit such as an ASIC (Application Specific Integrated Circuit) in which a circuit corresponding to computer-readable instructions is provided. In addition, the entirety or part of the terminal device 100 may be realized by using a circuit corresponding to computer-readable instructions on an FPGA (field-programmable gate array). In addition, the entirety or part of the terminal device 100 may be realized by appropriately combining the processor 102, a main memory, an ASIC, an FPGA, and the like.

The terminal device 100 may further include a component for reading the stored program or the like from the non-transitory media that stores the development program 114 and the access program 116 (computer-readable instructions). The media may be, for example, an optical medium, such as a DVD (Digital Versatile Disc), or a semiconductor medium, such as a USB memory.

In addition, the development program 114 and the access program 116 may not only be installed on the terminal device 100 through the media, but also be provided from a distribution server on the network.

(b2: Server 200)

The server 200 is also typically realized by a general-purpose computer. Since the basic hardware configuration of the server 200 is the same as that in FIG. 2, the detailed description thereof will not be repeated. However, the server 200 is often configured by a plurality of computers. In such a configuration, a mechanism is adopted so that data can be shared between the computers. In addition, the number of computers configuring the server 200 may be increased or decreased according to the load. In addition, a plurality of computers disposed at a plurality of geographically separated positions may virtually operate as a single server 200.

<C. Programming and Backtrace>

FIG. 3 is a diagram for describing programming and backtrace in the programming support system 1 according to the present embodiment. Referring to FIG. 3(A), when the user creates the source program 112 and executes an object-form at program generated by compiling the created source program 112, it is assumed that a failure event (typically, a run-time error) occurs in the code of a specific part (hereinafter, such a code is also referred to as "failure code 150").

When such a run-time error occurs, the error context 162 shown in FIG. 3(B) can be acquired by executing a backtrace function 160. The backtrace function 160 is a function for acquiring information indicating the content of a failure event that has occurred. The backtrace function 160 may be provided as a part of the debug function included in the integrated development environment. In addition, instead of the name "backtrace", this may be called by the name of stack trace. In addition, functions such as memory dump and core dump may be used.

As described above, the terminal device 100 has a function of backtrace or stack trace as a function of acquiring information indicating the content of a failure event that has occurred in the program. That is, the terminal device 100 acquires information indicating the content of a failure event by using the function of backtrace or stack trace.

In addition, also in a case where a failure event (typically, a compile error) occurs when compiling the source program 112, information (error context 162) indicating the content of the failure event that has occurred can be acquired in the same manner. In this case, the function of outputting the information indicating the content of the failure event that has occurred may be included in the compiler, linker, or the like included in the integrated development environment.

In the programming support system 1 according to the present embodiment, the failure event that occurs in the program may include at least one of a program run-time error and a program compile error.

<D. Outline of Processing>

Figure 4:
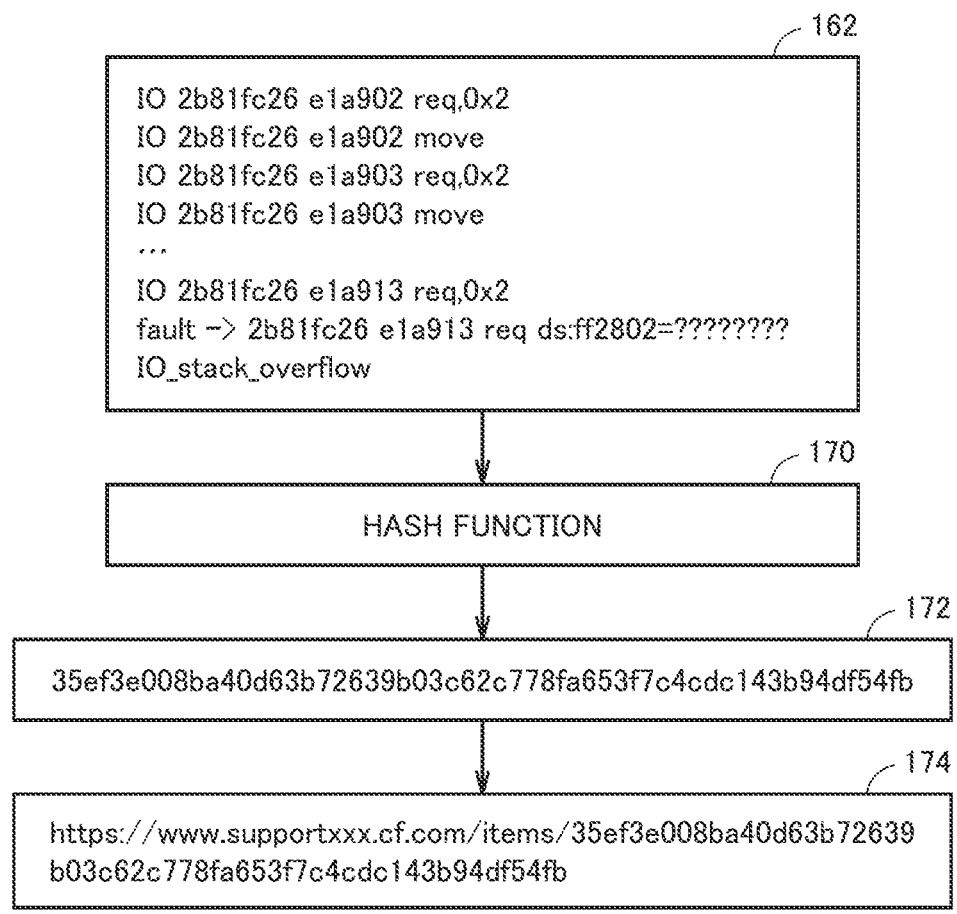
FIG. 4 is a schematic diagram for describing the outline of processing executed in the programming support system according to the present embodiment.

Next, the outline of the processing executed in the programming support system 1 will be described. FIG. 4 is a schematic diagram for describing the outline of the processing executed in the programming support system 1 according to the present embodiment. Referring to FIG. 4, it is assumed that a failure event (run-time error or compile error) occurs in the source program 112 created by the user and the error context 162 is generated.

The error context 162 is input to a hash function 170 as an example of the address determination means, and a hash value 172 having a predetermined number of characters is output. Then, an address 174 corresponding to the failure event that has occurred is determined from the hash value 172. As the hash function 170, a known algorithm (for example, SHA512, SHA384, and WHIRLPOOL) can be used.

In this manner, information indicating the content of the failure event can be input to the hash function 170 to determine an address having a predetermined length. In addition, as the address determination means, any conversion formula or mapper may be used as long as any character string can be mapped to a predetermined number of character strings.

Figure 5:
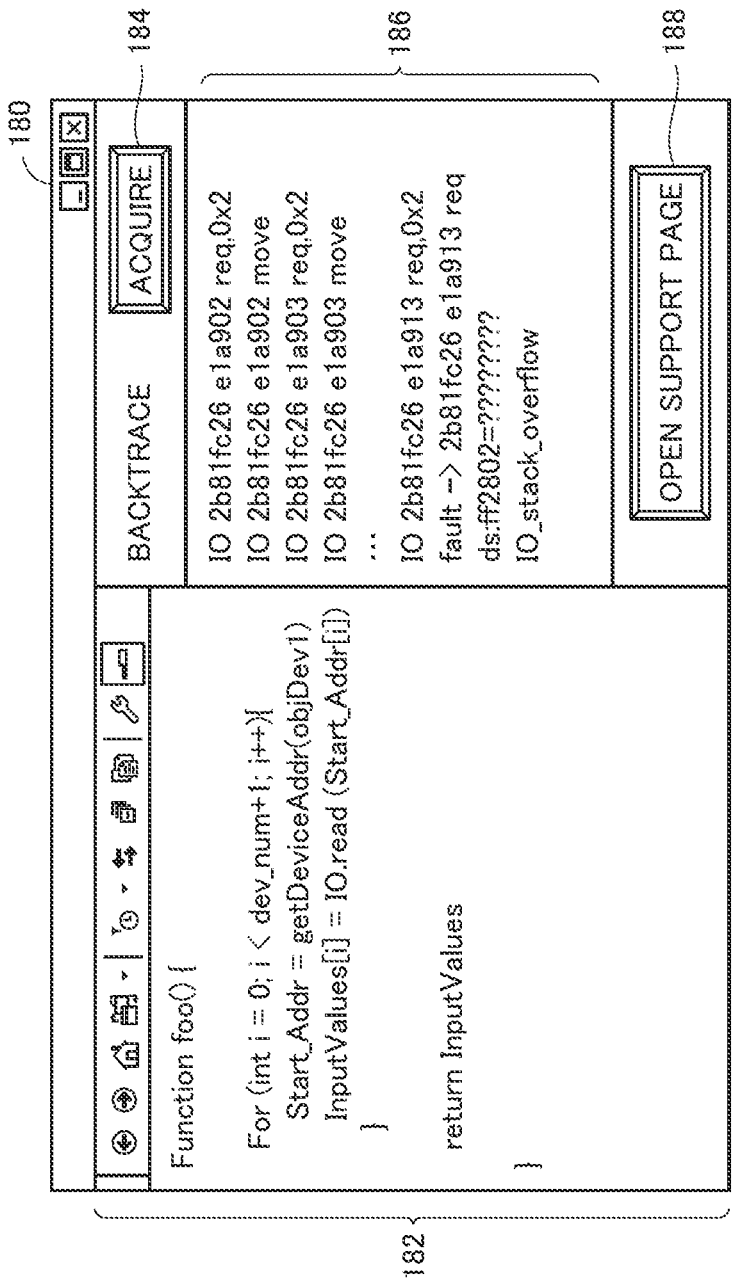
FIG. 5 is a diagram showing an example of a user interface screen of an integrated development environment provided in the programming support system according to the present embodiment.

FIG. 5 is a diagram showing an example of a user interface screen 180 of the integrated development environment provided in the programming support system 1 according to the present embodiment. Referring to FIG. 5, the user interface screen 180 includes an editor area 182 for creating and editing the source program 112, a backtrace button 184 for executing the backtrace function 160 when a failure event occurs, an error context display area 186 for displaying the error context obtained by the backtrace function 160, and an access button 188 for executing access to the server 200.

The user can create or edit any source program in the editor area 182. When any failure event occurs while executing or compiling the created source program, the error context 162 for the failure event that has occurred is acquired by pressing the backtrace button 184, and the error context display area 186 is displayed. The user can also debug the source program 112 while checking the content displayed in the error context display area 186.

In addition, by pressing the access button 188, the user can access the information (knowledge base 250) for supporting the debugging of the failure event that has occurred (see FIG. 6 described below).

Figure 6:
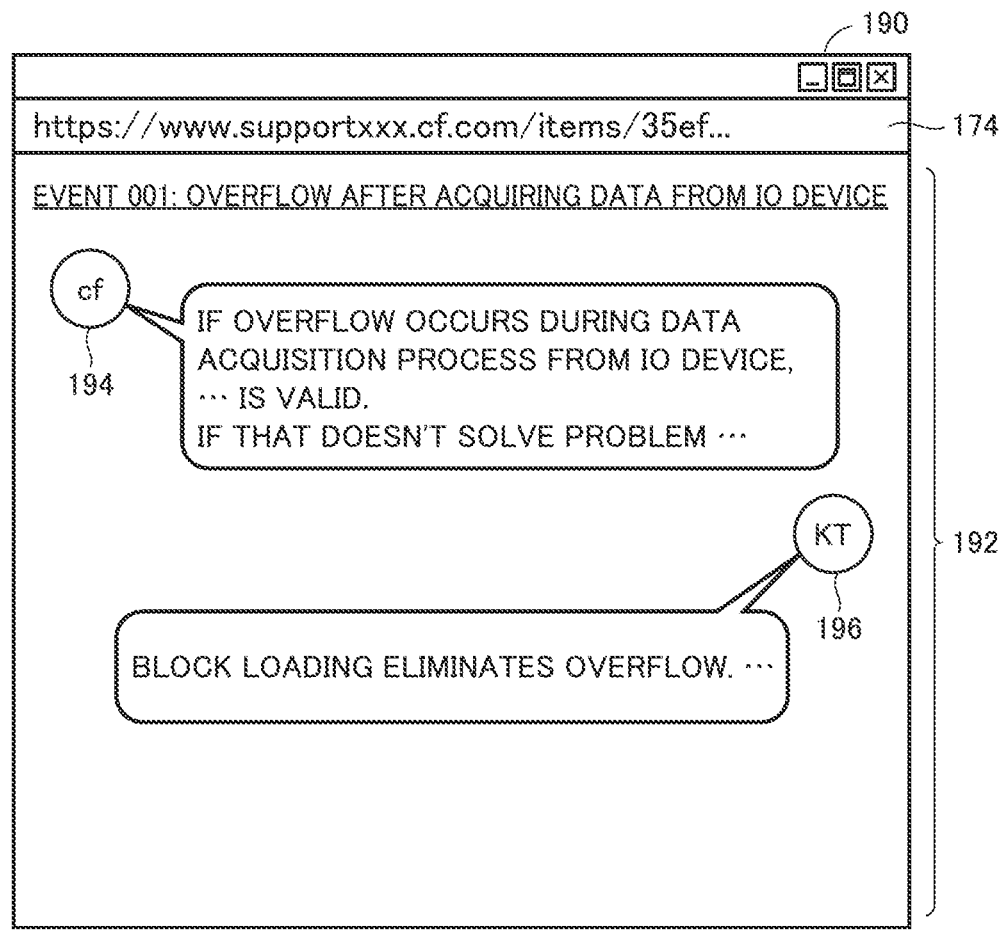
FIG. 6 is a diagram showing an example of a user interface screen showing an example of information provided by a server in the programming support system according to the present embodiment.

FIG. 6 is a diagram showing an example of a user interface screen 190 showing an example of information provided by the server 200 in the programming support system 1 according to the present embodiment. By pressing the access button 188 in FIG. 5, the terminal device 100 can access the specific address of the server 200. The knowledge base 250 corresponding to the failure event that has occurred is associated with the access destination, and the content of the knowledge base 250 of the access destination is displayed on the user interface screen 190 of the terminal device 100.

Referring to FIG. 6, the address 174 for referring to the target knowledge base 250 and failure information 192 included in the knowledge base 250 are displayed on the user interface screen 190.

The failure information 192 shown in FIG. 6 may have a format in which one or more users can arbitrarily post a message. That is, information for each failure event held by the server 200 can be updated by a plurality of users. For example, an operation mode is considered in which a support user 194 posts a message about a specific failure event and then a general user 196 posts an additional message based on his or her own experience.

As described above, in addition to the support entity that develops or maintains the integrated development environment, by allowing a plurality of users including general users who use the integrated development environment to post the obtained knowledge, it is possible to collect the knowledge about the common failure event. Therefore, a solution to the failure event can be easily found.

<E. Address Format>

Next, the format of the address for accessing the knowledge base 250 will be described. Basically, any address format may be adopted as long as it is possible to access the knowledge base 250 prepared for each failure event.

FIG. 7 is a diagram showing an example of an address format used in the programming support system 1 according to the present embodiment. As shown in FIG. 7(A), as an address format, the hash value 172 calculated from the error context 162 may be used as it is as a part of the address.

Alternatively, as shown in FIG. 7(B), identification information using the hash value 172 calculated from the error context 162 may be passed to the server 200 by using the GET type command of the HTTP protocol.

Without being limited to the address format shown in FIG. 7, any format that allows access to the specific knowledge base 250 corresponding to the failure event that has occurred may be used.

<H. Other Forms>

In the above description, as a typical example, a processing example in which the entire generated error context 162 is input to the hash function 170 is shown. However, without being limited to such a processing example, the information included in the error context 162 may be input to the hash function 170 after excluding information determined as an instance. Alternatively, a part of the information determined as an instance may be input to the hash function 170 after being padded with a predetermined number or character. By applying such preprocessing, it is possible to determine the same address for substantially the same failure event, so that the sharing of information can become easy.

In addition, in the above description, a so-called server client model configured to include one or more terminal devices 100 and the server 200 is illustrated, but a so-called serverless configuration in which information is shared between the terminal devices 100 may be adopted. Even in this case, the address determined by using the information indicating the content of the failure event that has occurred can be used as a key (identification information) for information sharing. In the serverless configuration, a storage unit that holds, manages, and provides information relevant to program creation in the integrated development environment of the terminal device 100 is substantially provided in one terminal device 100 or a plurality of terminal devices 100.

<G. Advantages>

According to the programming support system 1 according to the present embodiment, a plurality of users can easily access solutions to failure events that may occur when creating various programs. In addition, for substantially the same failure event, not only the information on the support side but also the information on the user side can be collected. Therefore, the knowledge base can be enhanced.

It should be considered that the embodiment disclosed is an example in all points and not restrictive. The scope of the present invention is defined by the claims rather than the above description, and is intended to include all modifications within the scope and meaning equivalent to the claims.

EXPLANATIONS OF LETTERS OR NUMERALS

1 PROGRAMMING SUPPORT SYSTEM
2 NETWORK
100 TERMINAL DEVICE
102 PROCESSOR
104 MAIN MEMORY
106 INPUT UNIT
108 DISPLAY
110 HARD DISK
112 SOURCE PROGRAM
114 DEVELOPMENT PROGRAM
116 ACCESS PROGRAM
118 NETWORK INTERFACE
120 INTERNAL BUS
150 FAILURE CODE
160 BACKTRACE FUNCTION
162 ERROR CONTEXT
170 HASH FUNCTION
172 HASH VALUE
174 ADDRESS
180, 190 USER INTERFACE SCREEN
182 EDITOR AREA
184 BACKTRACE BUTTON
186 ERROR CONTEXT DISPLAY AREA
188 ACCESS BUTTON
192 FAILURE INFORMATION
194, 196 USER
200 SERVER
250 KNOWLEDGE BASE

The invention claimed is:

1. A system, comprising:
at least one terminal device; and
a storage accessible from the at least one terminal device;
wherein the at least one terminal device includes one or more processors configured to execute computer-readable instructions to perform:
acquiring an error context indicating a content of a failure event that has occurred in a program, the error context comprising a character string generated when an error occurs when compiling or executing the program;
determining an identifier from a hash value, the hash value being calculated by inputting the character string of the error context into a hash function;
the storage holds information for each failure event in association with a unique identifier determined from the error context indicating the content of each failure event;
the storage provides, in response to an identifier requested by the at least one terminal device or a second terminal device, information for a failure event in association with the requested identifier;
wherein a plurality of different users access information for a respective failure event by using a uniform resource locator (URL) that includes a respective unique identifier associated with the respective failure event; and
wherein the respective unique identifier is determined by hashing a respective error context associated with the respective failure event.

2. The system according to claim 1,
wherein the at least one terminal device determines the hash value as the identifier having a predetermined length.

3. The system according to claim 1,
wherein the information for each failure event held by the storage is updatable by a plurality of users.

4. The system according to claim 1,
wherein the at least one terminal device acquires the error context by using a function of backtrace or stack trace.

5. The system according to claim 1,
wherein the at least one terminal device provides a development environment for the program; and
wherein the failure event that has occurred in the program includes at least one of a program run-time error and a program compile error.

6. An information processing method, comprising:
acquiring an error context indicating a content of a failure event that has occurred in any program, the error context comprising a character string generated when an error occurs when compiling or executing the program;
determining an identifier from a hash value, a processor calculating the hash value from the character string of the error context input into a hash function;
holding, in a storage, information for each failure event in association with a unique identifier determined from the error context indicating the content of each failure event;
in response to a requested identifier, providing at the storage, information for a failure event in association with the requested identifier;
wherein a plurality of different users access information for a respective failure event by using a uniform resource locator (URL) that includes a respective unique identifier associated with the respective failure event; and
wherein the respective unique identifier is determined by hashing a respective error context associated with the respective failure event.

7. The information processing method according to claim 6,
wherein the determining comprises determining the hash value as the identifier having a predetermined length.

8. The information processing method according to claim 6,
wherein the information for each failure event is updatable by a plurality of users.

9. The information processing method according to claim 6,
wherein the acquiring the error context comprises acquiring the information indicating the content of the failure event by using a function of backtrace or stack trace.

10. The information processing method according to claim 6,
wherein the failure event that has occurred in the program includes at least one of a program run-time error and a program compile error caused in a development environment for the program.

* * * * *